UNITED STATES PATENT OFFICE.

LUDWIG LIMPACH, OF BERLIN, GERMANY, ASSIGNOR TO LUDWIG FRIEDRICH RIEDEL, OF SAME PLACE.

PROCESS OF MAKING SALICYLO-ACETIC ACID.

SPECIFICATION forming part of Letters Patent No. 611,014, dated September 20, 1898.

Application filed December 1, 1897. Serial No. 660,428. (No specimens.) Patented in Germany June 14, 1896, No. 93,110.

*To all whom it may concern:*

Be it known that I, LUDWIG LIMPACH, a subject of the Emperor of Germany, residing at Berlin, in the German Empire, have invented certain new and useful Improvements in the Process of Producing Salicylo-Acetic Acid, (for which a patent has been issued in Germany, No. 93,110, dated June 14, 1896;) and I do hereby declare that the following is a full, clear, and exact description of the invention, which will enable others skilled in the art to make and use the same.

I have found that salicylo-acetic acid $$\left( C_6H_4 \diagup^{COOH}_{\diagdown O.CH_2COOH} \right)$$

may be obtained very simply and in theoretical quantity by heating the sodium salt of the salicylamid $$C_6H_4 \diagup^{CONH_2}_{\diagdown ONa}$$

with monochloracetates and then saponifying the group $CONH_2$ by heating with soda solution. The reaction takes place as follows:

$$C_6H_4 \diagup^{CONH_2}_{\diagdown ONa} + CH_2Cl.COONa =$$

$$C_6H_4 \diagup^{CONH_2}_{\diagdown O.CH_2.COONa} + NaCl.$$

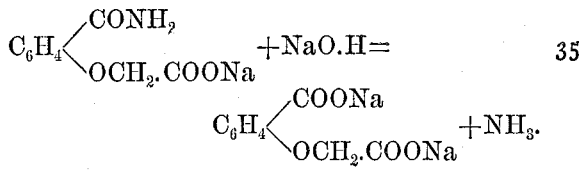

$$C_6H_4 \diagup^{COONa}_{\diagdown OCH_2.COONa} + NH_3.$$

Example: Thirteen parts of salicylamid, eight parts of caustic soda, and 9.5 parts of chloracetic acid are dissolved in water, and the solution is caused to evaporate by heat until it begins to deposit crystals. After this the liquid is boiled, with the aid of a reflux cooler, until it no longer has an alkaline reaction. From this solution the amid of salicylo-acetic acid is precipitated by means of hydrochloric acid, and saponification is produced in the usual manner by boiling with alkali.

Having thus described my invention, what I claim as new therein, and desire to secure by Letters Patent, is—

The process for the manufacture of salicylo-acetic acid which consists in causing monochloracetates to act on salts of salicylamid, and saponifying the product thus obtained, substantially as described.

In testimony whereof I have hereunto set my hand in the presence of two subscribing witnesses.

LUDWIG LIMPACH.

In presence of—
MARC FUCHS,
LUDWIG WENGHÖFFER.